United States Patent Office 2,933,392
Patented Apr. 19, 1960

2,933,392

COMPOSITION CONTAINING VITAMIN A

Placido Iacono, Iselin, N.J., and Samuel M. Weisberg, East Islip, N.Y., assignors, by mesne assignments, to National Dairy Products Corporation, New York, N.Y., a corporation of Delaware No Drawing. Application April 15, 1953
Serial No. 349,084

11 Claims. (Cl. 99—2)

This invention relates to a composition containing vitamin A and more particularly to a vitamin A composition having improved stability.

Dry vitamin A preparations have been available for use in dry animal feed formulations and for other purposes, but these preparations have presented a serious storage problem inasmuch as the vitamin A displays a high tendency to deteriorate in potency between the time of its incorporation in the feed and the consumption of the product. This has been true of concentrates both of the naturally-occurring vitamin, obtained from plants and fish oils, and of the synthetic vitamin.

It has been customary to supply vitamin A from plant materials on a carrier. The vitamin A extracted from plant lipides with the aid of a solvent is then dispersed on the solid carrier. Among the carriers which have been used are soyabean oil meal, wheat germ oil meal and similar cereal and vegetable materials. However, although the stability of some of these preparations has been good when stored at normal room temperatures of 25° C., most of the compositions to date have had a very poor stability at higher storage temperatures, equivalent to summer temperatures, of the order of 30 to 45° C. (86–113° F.).

The plant-derived vitamin A concentrates also have been combined with oils but with no better results. Wall and Kelley, Industrial and Engineering Chemistry 38, 215–218 (1946), showed that the stability of carotene derived from vegetable leaf meals in crude soyabean and peanut oils, refined cotton seed, corn, soyabean and peanut oils, lard, hydrogenated vegetable oil and mineral oil decreased rapidly as storage temperatures increased from 5 to 37.5° C. They also found that the addition to the carotene-in-oil solutions of 0.03% soyabean lecithin, which increases the stability of lard and other fats, was ineffective with both crystalline and crude carotene at 5, 24 and 37.5° C.

In a later article (Industrial and Engineering Chemistry 43, 1146–1150 (1951)) these workers reported an investigation of poultry feed mash, soyabean meal and broccoli leaf meal as carriers, using vitamin A from a variety of sources and storing the samples at 4, 25 and 37.5° C. They concluded that although it was possible to make certain preparations which were stable at 25° C. it was impossible under experimental conditions to prepare dry mixtures which were stable at 37.5° C. (98° F.) and suggested that probably over half the vitamin A in an average mixed feedstuff would be lost in one month at extreme summer temperatures. A variety of carriers were tested by Wall and Kelley but they could draw no general conclusions from the properties of these carriers and decided that the choice had to be largely empirical, with soyabean meal and broccoli meal evidently the best of those tested, though neither of these was particularly effective at 37.5° C.

Burns and Quackenbush, Industrial and Engineering Chemistry 43, 1592–1593 (1951), reported on the stability of several commercial dry vitamin A concentrates at room temperature. That they are sufficiently stable at summer temperatures is subject to doubt, in view of the stability reported at room temperature and Wall and Kelley's work. These commercial concentrates would be used only in dry feeds, for they are not readily dispersible in water.

Many carriers which have been tried have been reported to be ineffective. U.S. Patent No. 2,496,634 to Melnick, dated February 7, 1950, states that lactose, sucrose, dry skim milk, lactalbumin, starch and pulverized peanut skins fail to preserve vitamin A under the accelerated storage test described therein, at 45° C. (113° F.). The patentee recommends dissolving the vitamin A in hydrogenated soya oil and adding defatted soya meal.

In accordance with the invention, a fat-soluble vitamin composition of high stability at elevated temperatures approximating 100 to 110° F. (37.8 to 43° C.) is provided which includes an edible fatty material, an antioxidant, lecithin, milk solids (including milk protein) and a fat-soluble vitamin. Vitamin A is a preferred vitamin, but instead of or in addition thereto, the composition may contain other vitamins and ingredients which do not affect the stability thereof, such as the D, K and E vitamins.

The invention is applicable to vitamin A obtained either from natural sources or prepared synthetically. Vitamin A, trimethyl cyclohexenyl dimethyl octatetraene carbinol, exists in the form of the palmitic acid ester in fish oils, especially those from cod, halibut, mackerel and black sea bass. Vitamin A acetate also is known, as well as certain ethers including the methyl ether, etc. All of these forms are biologically as potent as the alcohol, and it will be understood that in the specification and claims when vitamin A is referred to, the alcohol, ester and ether forms are included, inasmuch as they are equivalents. Vitamin A fish liver oil concentrates and β-carotene concentrates from plant materials, as well as synthetic vitamin A palmitate, are exemplary satisfactory vitamin A preparations.

The milk solids need not be free from milk fat, and thus whole milk can be utilized as a source of milk solids. However, inasmuch as butterfat is oxidizable, and it is known that vitamin A may be oxidized more rapidly in the presence of a fat which is itself oxidizable, nonfat milk solids are advantageously employed in many instances. Skim milk, buttermilk and whey derived from cheese manufacture, such as casein and Cheddar wheys, including delactosed wheys, and lactase enzyme hydrolyzed whey are sources of nonfat milk solids including milk protein which would ordinarily be employed in the invention. All of these fat and nonfat materials will be understood to come within the generic term "milk product" as it is used in the specification and claims.

Both dry and fluid milk products are useful. Fluid products can be utilized at any desired solids content, but to facilitate drying of the composition it is better to concentrate them to a solids content within the range from about 20 to 35% so that the fluid composition has a solids content of 30% or more. The solids content of course is not critical. The fatty mixture is more readily dispersed in a concentrated milk product. It also is possible to prepare a milk concentrate starting from milk solids, such as dried skim milk or whole milk or dried whey solids, reconstituting them with water to form a solution of the desired solids content.

The milk product can be pasteurized under conventional conditions, such as by holding it at 145° F. for 20 minutes, although if desired pasteurization can be postponed until a later stage in the process.

The fatty material, which term is inclusive of the edible fats and oils, should be stable against oxidation due to the well known tendency of vitamin A to oxidize in the presence of an oil or fat which itself oxidizes. Oxidation stability can be imparted or assisted by antioxidants. Preferably, the fatty material is substantially saturated because of the greater stability against oxidation of saturated fats; fats and oils having an iodine number below about 40, preferably below 10, are satisfactory. Edible nondrying fats and oils such as coconut oil, cacao butter, and the various tallows, soyaben oil sludge, hydrogenated drying and semidrying vegetable oils such as hydrogenated corn, rice and soyabean oils, hydrogenated soyabean oil sludge, and hydrogenated cereal and nut oils, are exemplary of those fats and oils useful in the invention. The fatty material can be a liquid, at normal temperatures, or a solid which can be melted at a reasonably low temperature so as to aid the blending of the fatty material with the other ingredients. An especially apt choice of fat is hydrogenated soyabean oil sludge which contains a multiple antioxidant system.

An antioxidant is also included, such as gentisic acid, propyl gallate, butylated hydroxyanisole, citric acid, nordihydroguaretic acid or a similar nontoxic antioxidant which is effective in preserving fats, Lecithin also is added. Lecithin is a well known synergist for antioxidants (Mitchell, Schrenk and King, Industrial and Engineering Chemistry 41, 570–572 (1949)). Chemically, lecithin is a mixture of phospholipids, which are esters of fatty acids, such as oleic, stearic and palmitic, with glycerophosphoric acid and choline, and are derived from various fatty oils. Lecithin from soya oil, i.e., soya phospholipids, is a preferred material, but phospholipid mixtures from other vegetable and plant oils are useful.

The level of vitamin A chosen for fortifying the milk vehicle is not critical and will depend upon the requirements for the product, but the proportion of fat to vitamin A has an effect upon the stability. High levels of vitamin A (50,000 I.U. per gram) are much less stable than 10,000 to 25,000 I.U. per gram. A fat content of from 1 to 10% by weight of the composition with from 10,000 to 25,000 I.U. per gram of vitamin A does not give as stable a product under the accelerated storage tests employed in evaluating the compositions of the invention as a fat content of from 15 to 45%. As the fat content is increased above 45% stability again decreases although at the 60% level stability is not as low as at the 5% level. At concentrations of vitamin A within the range of 10,000 to 25,000 I.U. per gram, fat contents of from 15 to 45% by weight of the composition produces products of excellent stability under the test conditions. An international unit of vitamin A is the activity of 0.6 microgram of pure $\beta$-carotene.

The proportion of milk solids appears to be important with respect to the protein content thereof. With these proportions of fat, it is desirable to have approximately equal proportions of milk protein. However, the proportions of protein can be varied considerably and ratios of protein to fat as low as 1:3 and as high as 2:1 have been used with satisfactory results. On a weight percent basis, thus the proportion of milk protein can lie within the range from 5 to 90% by weight of the dry composition. Accordingly, the amount of milk solids will be sufficient to furnish this amount of protein.

The amounts of leithin and antioxidant are not critical but enough would be used to preserve the fat and milk product against oxidation. Usually from 1 to 3% of lecithin by weight of the fat and from 0.1 to 1% of antioxidant by weight of the fat are adequate, although larger amounts can be employed without disadvantage.

The ingredients can be blended in any manner which ensures thorough mixing. The presently preferred method is to disperse or dissolve the vitamin, lecithin and antioxidant in the liquid or melted fatty material, and then mix the resulting fluid with the fluid milk product. This appears to produce an initial solution of the vitamin, and dispersion or solution of the lecithin and antioxidant in the fatty material as the continuous phase, and a second dispersion of this fatty fluid as the discontinuous phase in the milk product as the continuous phase. The vitamin therefore is within the fatty material which is itself dispersed within the milk product.

Preferably, the fluid mixture or dispersion is homogenized at a sufficiently high pressure to ensure complete dispersion of the fatty material in the milk product. If the fatty material is a solid, homogenization is effected at a temperature above the melting point of the fatty material. Pressures of from 1,000 to 5,000 p.s.i. at temperatures from 75° to 140° F., for example, 3000 p.s.i. at 120° F., are generally satisfactory but these homogenization conditions are not critical and those skilled in the art will appreciate what conditions should be used to meet the requirements. However, pressures below 1,000 p.s.i. may not be desirable, as the dispersion may not be uniform.

The composition can be utilized in liquid form, but for many purposes the dry composition is preferred. The dispersion can be dried by any conventional method but in a commercial process spray-drying would be preferred since it is fast and capable of producing a dry product of relatively uniform size particles which are readily dispersible in water. The particular conditions employed will depend upon the apparatus. Inlet air temperatures of from 250 to 350° F. and outlet air temperatures of from 150 to 200° F. have been used with excellent results. The temperature of the feed is within the range from 120 to 150° F.

The reason for the high stability of the dry composition is not as yet fully understood. It has been suggested that, inasmuch as the fatty material is dispersed in the milk product, a protein film may completely envelop the dispersed fat globules, and this film may provide an additional protective layer. The fat globule protects the vitamin A within it, and the fat globule in turn is protected by the protein film against oxidation. It is also protected in some measure by the protein film against the lipolytic enzyme often present in a cereal feedstuff.

The composition of the invention is illustrated by the following examples:

*Example 1*

Skim milk was condensed to a solids content of 23% solids (758 lbs.) and brought to 140° F. with constant agitation and held at that temperature for 20 minutes to pasteurize it. The milk then was cooled to 100° F.

Coconut oil (70 lbs.) was melted and with the aid of a Lightnin stirrer there was blended therein 681 g. of Yelkin (soya lecithin), 112.3 g. Tenox II (a mixture of butylated hydroxyanisole, propyl gallate and citric acid dissolved in propylene glycol) 920 g. of vitamin A palmitate (1.36 million units per g.) and 497.2 g. of vitamin D (1 million units per g.). The mixture then was added to the pasteurized skim milk and the batch homogenized at 3,000 p.s.i. and 120° F. The pH of the mixture was 6.25, and the solids content 30%.

The batch was fed into a spray-drier at a rate of 4 gallons per hour, an inlet air temperature of 300° F. and an outlet air temperature of 185° F. under a pressure of 2,000 p.s.i. The composition of the powder ranged from 97.7 to 98.2% solids and included: fat 27.9–31.5%, protein 24.8–23.6%, lactose 40.7–37.2%, ash 6.24–5.77%, acidity as lactic acid 0.59–0.60%, vitamin A 10,847–11,570 I.U. per gram.

The stability of the preparation was determined by an accelerated storage test in which a sample of the material was held for 500 hours at 110° F. in air. At the conclusion of the test the vitamin A value was 10,595–10,202 I.U. per gram. This is indicative of an extraordinary vitamin A stability, since the test represents severe oxidative conditions.

This material is useful as a premix for a dry animal feed formulation.

Example 2

Nonfat spray-dried milk solids (38.5 lbs) was reconstituted with 128 lbs. of water and brought to 100° F. Refined coconut oil (15.5 lbs.) was melted and with the aid of a Lightnin stirrer there was mixed therein 149.7 g. lecithin (TTS Yelkin), 24.9 g. Tenox II (a mixture of butylated hydroxyanisole, propyl gallate and citric acid dissolved in propylene glycol), 184 g. vitamin A palmitate (136 million units per g.) and 99.8 g. vitamin D (1 million units per g.). This mixture then was added to the fluid skim milk with agitation and the slurry homogenized at 3,000 p.s.i. and 120° F. The batch then was spray-dried using a high pressure nozzle at 2,500 p.s.i. at an air inlet temperature of 300° F. and an air outlet temperature of 190° F. The feed was at 120° F., total solids 30% and the feed rate 6.4 gallons per hour. The powder consisted approximately of 70% nonfat milk solids and 30% fatty material. The vitamin A potency was 9,700 I.U. per g.

This material was subjected to an accelerated storage test to determine vitamin A stability. A sample of the material was held 21 days at 113° F. in air. At the end of this time the vitamin A value was 9,400 I.U. per g. After an additional 21 days (42 days in all) the vitamin A value was 8,800 I.U. per g. This vitamin A stability is extraordinary under these storage conditions which are unusually severe.

The vitamin A powder was incorporated in a high mineral animal feed mix of the following composition:

|  | Percent |
|---|---|
| Whole wheat | 2.4 |
| Oat groat flour | 14.0 |
| Delactosed whey | 4.0 |
| Skim milk solids | 4.0 |
| Buttermilk solids | 62.0 |
| $CaCO_3$ | 1.0 |
| $Ca_3(PO_4)_2$ | 1.0 |
| NaCl | 1.0 |
| $Na_2SO_4$ | 0.05 |

The vitamin A value of the feed was 31 I.U. per g. After storage for 500 hours at 113° F. the vitamin A value was 26 I.U. per g. showing that vitamin A has excellent stability in the presence of minerals, which are known to accelerate the destruction of vitamin A in conventional preparations.

Example 3

A vitamin A powder was prepared as set forth in Example 1. The powder was incorporated in an animal feed formulation of the following composition in an amount to suppply 15,025 I.U. per lb.:

|  | Percent |
|---|---|
| Milk solids | 65 |
| Cereal products | 35 |

The animal feed was subjected to an accelerated storage test with the following results:

| Time held at 100° F. | Vitamin A value, I.U. per lb. |
|---|---|
| 30 days | 12,881 |
| 60 days | 12,040 |
| 90 days | 11,115 |
| 120 days | 9,858 |

These conditions are relatively severe and the animal feed shows excellent vitamin A stability.

Example 4

The vitamin A powder of Example 1 was reconstituted with water and subjected to a dispersibility test in conjunction with six portions of a conventional whole milk powder. The results were as follows:

|  | Vitamin A Powder | Average of 6 Whole Milk Powders |
|---|---|---|
| Shake Test, Percent | 92+4 | 66+8 |
| Photo Turbidity, 1/min | 4.3+0.3 | 3.4+2.0 |

The dispersibility tests show that the vitamin A powder was considerably more readily dispersed than the whole milk powders which had been prepared under the same conditions as the vitamin A powder. The photo turbidity measurements show that reconstitutability at very low dispersing energies was as good as the whole milk powders.

The distribution of particle size in the vitamin A powder was determined on 1,000 particles with the following results:

| Size, microns: | Frequency, percent of total |
|---|---|
| 0–5 | 11.5 |
| 5–10 | 29.1 |
| 10–15 | 22.9 |
| 15–20 | 11.9 |
| 20–25 | 8.3 |
| 25–30 | 6.6 |
| 30–35 | 5.0 |
| 35–40 | 0.8 |
| 40–45 | 2.8 |
| 45–50 | 0.6 |
| 50–55 | 0.2 |
| 55–65 | 0.3 |
|  | 100.0 |

These test results show that the composition would be particularly effective in emulsion-type feeds, which are dispersions of nutrient materials in water.

Example 5

Hydrogenated soyabean oil sludge (iodine value 70, 1,590 g.) was melted and, with the aid of a Lightnin stirrer, there was blended therein 34 g. of lecithin, 46 g. of vitamin A, (1.36 million units per gram) and 24.8 g. of vitamin D. The liquid fat mixture then was blended in 30.7 lbs. of condensed skim milk (8.75 lbs. solids) at 120° F. and the mixture homogenized at 1,500 p.s.i. and 120° F. The solids content of the homogenizate was 36%.

The material was fed into a spray-drier at a rate of 4.9 to 5.2 gallons per hour, an inlet air temperature of 300° F. and an outlet air temperature of 180° F. The product had excellent storage stability and was useful as a premix for a dry animal feed formulation.

Example 6

Vitamin A (1.35 million units per g., 46 g.) and 24.8 g. of vitamin D were blended in 1,590 g. of melted hydrogenated soyabean oil sludge (iodine value 70). To this blend was added 5.6 g. of Tenox II (a mixture of butylated hydroxyanisole, propyl gallate and citric acid dissolved in propylene glycol) and 34 g. of lecithin. The mixture was blended in 30.7 lbs. of condensed skim milk (8.75 lbs. solids) at 120° F. and the mixture homogenized at 1750 p.s.i. and 120° F.

The batch was spray-dried under the conditions set forth in Example 5. This material displayed good vitamin A storage stability and was useful in animal feed compositions.

Example 7

A suspension was prepared of dry whey solids (2,000 g.) in 10 lbs. of water. Hydrogenated soyabean oil sludge (795 g., iodine value 70) was melted and in it was blended 28 g. of Tenox II and 17 g. of lecithin, followed by 23 g. of vitamin A (1.36 million units per gram) and 12.4 g. of vitamin D. The fat mixture was blended in the whey slurry at 120° F. and the mixture homogenized at 2,000 p.s.i. at the same temperature. The homogenizate had a solids content of 38.37%.

The material was fed at 120° F. into a spray-drier at a rate of 4.9 to 5.2 gallons per hour. The inlet air temperature was 300° F. and the outlet air temperature 180° F. This material could be incorporated in an animal feed formulation to supply vitamin A and other nutrients and displayed excellent storage stability.

*Example 8*

Dry whey solids (2,000 g.) were dispersed in 10 lbs. of water. Vitamin A, 23 g. (1.36 million units per gram), vitamin D, 12.4 g., 17 g. of lecithin and 2.8 g. of Tenox II were uniformly blended in 795 g. of melted coconut fat. The fat mixture then was stirred into the whey slurry at 120° F. and the mix homogenized at 2,000 p.s.i. and 120° F.

The batch was fed into a spray-drier at 120° F. at a rate of 4.9 to 5.2 gallons per hour. The inlet air temperature was 300° F. and the outlet air temperature 180° F. The material could be incorporated in a dry animal feed formulation and displayed good vitamin A storage stability.

*Example 9*

Hydrogenated soyabean oil sludge (15 lbs., iodine value 13) was melted and to it was added 150 g. of soya lecithin, 25.4 g. of Tenox II, 179 g. of vitamin A palmitate (1.63 million I.U. per gram) and 97 g. of vitamin D (1 million I.U. per gram). The mixture was added to a preheated agitated cooker and 54 lbs. of hot water added. Next there was added slowly 50 lbs. of condensed skim milk (30% solids) and 45 lbs. of hydrolyzed whey (46% solids). The batch was blended thoroughly, pasteurized at 150° F. for 20 minutes and homogenized at 2,000 p.s.i. and 140° F.

The batch was fed into a spray drier at 140° F. (30% solids content). The inlet air temperature was 300° F. and the outlet air temperature was 184° F. The product was a clean dry yellow powder having excellent vitamin A stability on storage and useful as a low cost product for dry animal feed formulations.

In addition to vitamin A, as the examples illustrate the composition can include other fat-soluble vitamins such as vitamins K, D and E and the compositions containing these vitamins likewise have good stability.

The composition is useful in animal feeds in which it can be incorporated either in the dry or emulsion state, and the animal feeds obtained will retain a high vitamin A activity even after storage at extreme summer temperatures for many months. Such animal feeds can be of conventional formulation and further details need not be given here inasmuch as these are well known.

The product also is useful as a concentrate for human food products in which it can be readily mixed, dispersed and dissolved to increase the vitamin content. Thus skim milk or whole milk powder could be readily fortified with fat-soluble vitamins using the preparation of the invention.

All parts and percentages in the specification and claims are by weight, and are based on the weight of the dry composition.

We claim:
1. A vitamin composition consisting essentially of discrete spray-dried particles of natural milk product solids including milk protein having dispersed therein from 15 to 45% by weight of a fatty material stable against oxidation, said fatty material containing a fat-soluble vitamin, from 1 to 3% lecithin by weight of the fat, and from 0.1 to 1% antioxidant by weight of the fat, said milk protein being in an amount proportional to the fatty material within the range of ratios from 1:3 to 2:1 by weight of the composition, and completely enveloping the fatty material dispersed in each particle in a continuous film of milk protein.

2. A vitamin composition in accordance with claim 1 in which the vitamin is a mixture of vitamin A and vitamin D.

3. A vitamin composition in accordance with claim 1 in which the vitamin is vitamin A.

4. A vitamin A composition in accordance with claim 3 comprising from 10,000 to 25,000 I.U. of vitamin A.

5. A vitamin A composition in accordance with claim 3 in which the milk product solids comprise skimmed milk solids.

6. A vitamin A composition in accordance with claim 3 in which the milk product solids comprise whey solids.

7. A vitamin A composition in accordance with claim 3 in which the fatty material is coconut oil.

8. A vitamin A composition in accordance with claim 3 in which the fatty material is hydrogenated soyabean oil sludge.

9. A vitamin A composition in accordance with claim 3 in which the antioxidant comprises a mixture of butylated hydroxyanisole, propyl gallate and citric acid dissolved in propylene glycol.

10. An animal feed composition comprising milk solids, a cereal product and a vitamin composition in accordance with claim 1.

11. An animal feed composition comprising milk solids, a cereal product and a vitamin composition in accordance with claim 3.

References Cited in the file of this patent

UNITED STATES PATENTS

| | | |
|---|---|---|
| 1,622,390 | Miller | Mar. 29, 1927 |
| 2,375,279 | Buxton | May 8, 1945 |
| 2,394,456 | Korner | Feb. 5, 1946 |
| 2,496,634 | Melnick | Feb. 7, 1950 |
| 2,634,210 | Kimball | Apr. 7, 1953 |
| 2,650,895 | Wallenmeyer | Sept. 1, 1953 |
| 2,685,517 | Dunmire | Aug. 3, 1954 |
| 2,702,262 | Bavley et al. | Feb. 15, 1955 |

FOREIGN PATENTS

| | | |
|---|---|---|
| 297,256 | Great Britain | 1928 |
| 301,651 | Great Britain | 1928 |

OTHER REFERENCES

Kraybill: Jour. American Oil Chem. Soc., September 1949, XXVI, No. 9, pages 1–5.